(12) United States Patent
Christensen

(10) Patent No.: US 6,652,205 B2
(45) Date of Patent: Nov. 25, 2003

(54) REVERSIBLE, PORTABLE WINCH WITH BIDIRECTIONAL RATCHET TEETH FOR ATTACHMENT TO LOAD-BEARING STRUCTURE

(76) Inventor: David Christensen, 11 Moores Mill Rd., Pennington, NJ (US) 08534

( * ) Notice: Subject to any disclaimer, the term of this patent is extended or adjusted under 35 U.S.C. 154(b) by 195 days.

(21) Appl. No.: 09/757,356

(22) Filed: Jan. 9, 2001

(65) Prior Publication Data

US 2001/0019689 A1 Sep. 6, 2001

Related U.S. Application Data

(63) Continuation-in-part of application No. 09/399,828, filed on Sep. 21, 1999, now Pat. No. 6,203,259.

(51) Int. Cl.[7] .................................................. B60P 7/08
(52) U.S. Cl. ...................................................... 410/100
(58) Field of Search ................................ 254/214, 223, 254/243; 296/3; 410/12, 32, 34, 97, 100, 101, 103

(56) References Cited

U.S. PATENT DOCUMENTS

| | | | |
|---|---|---|---|
| 239,103 A | * | 3/1881 | Landers |
| 250,264 A | * | 11/1881 | Landers |
| 733,842 A | * | 7/1903 | Howell |
| 1,144,310 A | * | 6/1915 | Owens |
| 1,289,403 A | * | 12/1918 | Cureton |
| 4,900,203 A | | 2/1990 | Pope ............................ 410/36 |
| 5,137,320 A | | 8/1992 | Christensen ................... 296/3 |
| 5,238,280 A | | 8/1993 | Christensen ................... 296/3 |
| 5,755,549 A | | 5/1998 | Ogrodnick ................... 414/500 |
| 5,791,844 A | | 8/1998 | Anderson .................... 410/103 |

* cited by examiner

Primary Examiner—Stephen T. Gordon
Assistant Examiner—Paul Chenevert
(74) Attorney, Agent, or Firm—Kenneth P. Glynn, Esq.

(57) ABSTRACT

The present invention is a reversible, portable winch for attachment to a load-bearing structure. It includes a shaft for rotation; a take-up reel for winding and unwinding a flexible securing strap, the take-up reel being connected to the shaft and affixed thereto for rotation therewith; a flexible securing strap attached to the take-up reel at a first end thereof; a plurality of bidirectional pawl-engaging teeth located about the shaft and so as to prevent and permit rotation of the take-up reel and the shaft by being engaged and disengaged with a pawl; a winding mechanism connected to the shaft or the take-up reel for winding the shaft and the take-up reel; support for supporting the shaft and the pawl. The winch is connected via its shaft to a support and the pawl may be movably connected to the support as well. The present invention is also a portable winch component set for installation into a support at some later time.

16 Claims, 7 Drawing Sheets

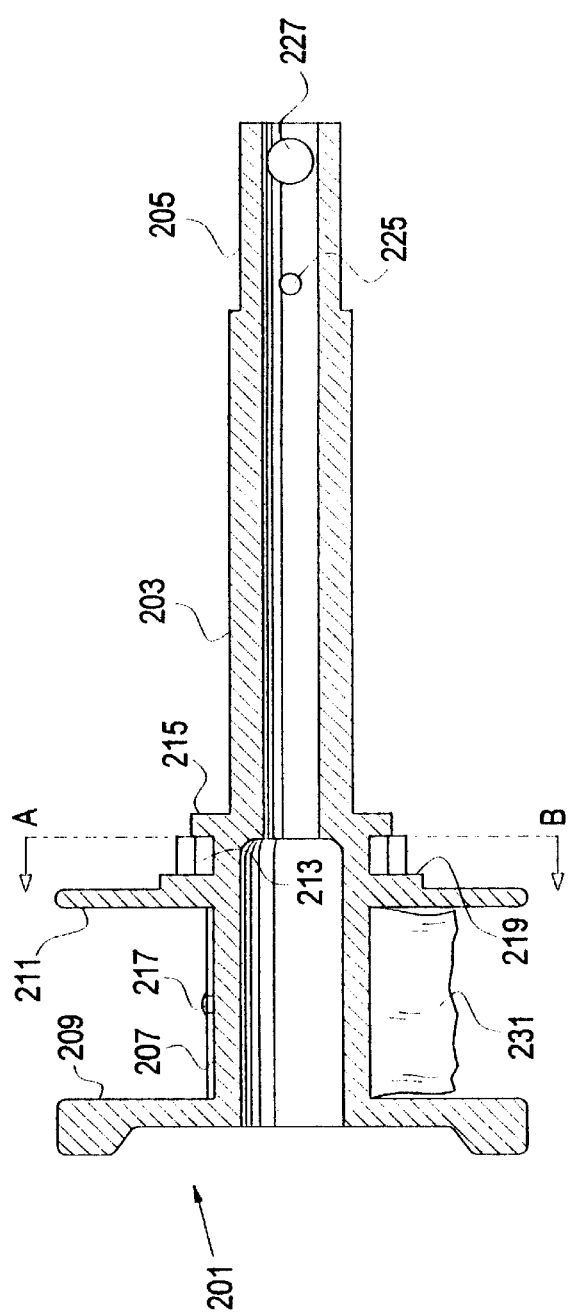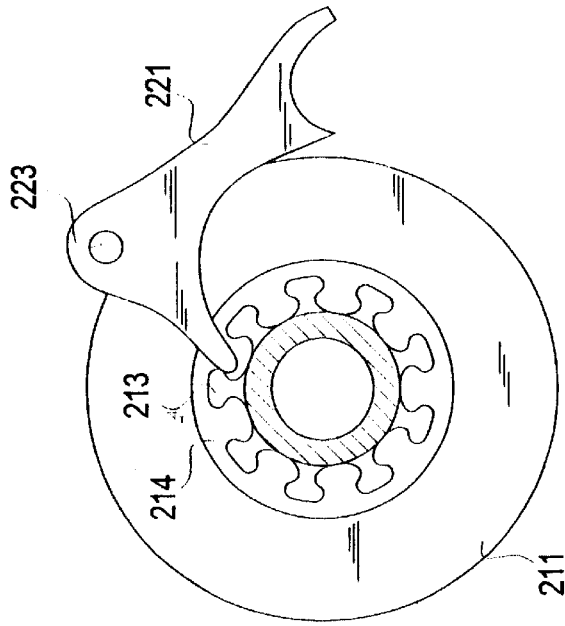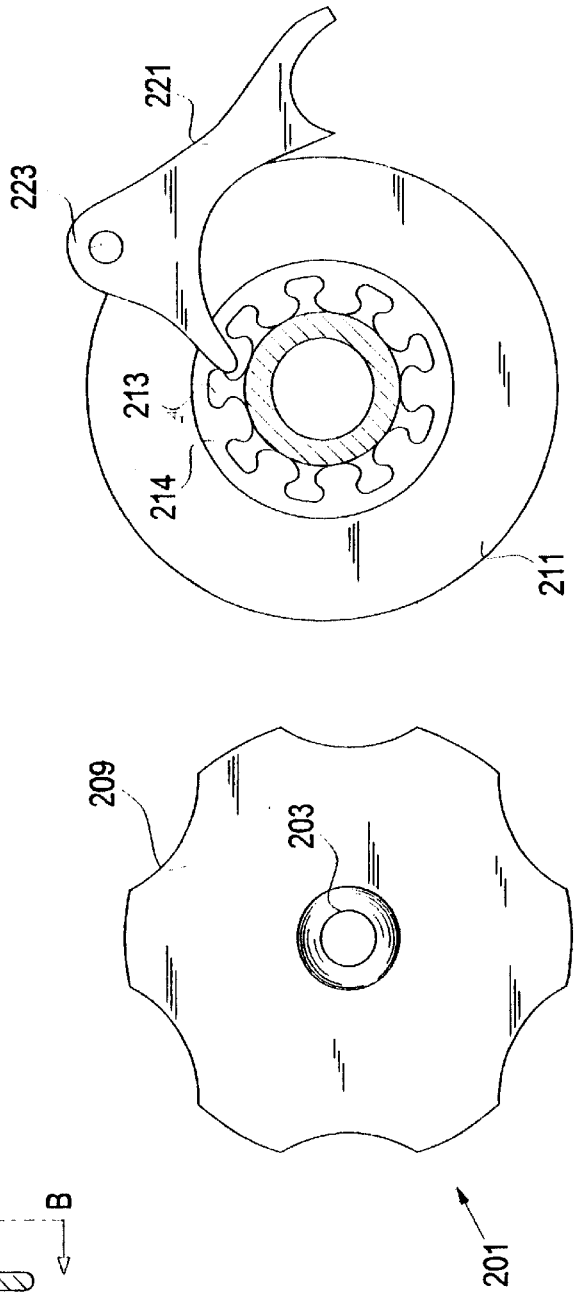
FIG. 2
FIG. 3
FIG. 4

REVERSIBLE, PORTABLE WINCH WITH BIDIRECTIONAL RATCHET TEETH FOR ATTACHMENT TO LOAD-BEARING STRUCTURE

REFERENCES TO RELATED APPLICATIONS

This application is a continuation-in-part of U.S. patent application Ser. No.: 09/399,828 entitled "Reversible, Portable Winch With Bidirectional Ratchet Teeth" filed on Sep. 21, 1999 now U.S. Pat. No. 6,203,259, entitled "Reversible, Portable Winch With Bidirectional Ratchet Teeth" by the inventor herein.

BACKGROUND OF THE INVENTION

1. Field of the Invention

The present invention involves unique winches for attachment to load-bearing structures, such as buildings, vehicles, etc., and especially to ladder utility racks attached to truck beds of pick up trucks, vans, the like. The winches involve the use of support structures to which they may be installed and from which they may be removed for portability and reversibility. The present invention also includes the winch components separate from their support structures.

2. Information Disclosure Statement

The following represents patents which illustrate pick-up truck cargo bed utility racks and others which illustrate winches:

U.S. Pat. No. 4,900,203 to Ronald W. Pope, describes a load-tie-down system which includes a load-supporting structure having a side support and a second support. A winch assembly is operably mounted on the load-supporting structure and includes a winch frame having a crosspiece and two struts projecting downward from the crosspiece. A winch drum is rotatably mounted between the two struts of the winch frame and a belt is attached at one end to and wound around the winch drum. A hook is attached to the free end of the belt. The belt is anchored by the hook attaching to an anchor located on the winch frame. The anchor includes a bar on the winch frame around which the hook may fasten. A lock to restrain the rotation of the winch drum is also included having a ratchet wheel attached to the winch drum and a pawl pivotally attached to the winch frame. The winch drum and anchor are located so that the belt may extend around the crosspiece and a load and then anchor on the winch frame.

U.S. Pat. No. 5,137,320 to David Christensen describes a ladder utility rack for pick-up truck cargo beds. It has two parallel horizontal base rails and at least two vertical stanchion units. Each base rail has horizontal and vertical running surfaces and each is adapted to nest atop and against sidewalls of a cargo bed. These base rails are not connected to one another except via the stanchion units. These units have vertical legs running from each of the base rails upwardly and inwardly and terminate at a commonly connected horizontal cross member. A second embodiment includes an additional set of rails, i.e. mounting rails, which run parallel to the base rails and, together with the base rails, form a horizontal platform for mounting items thereon to be transportable.

U.S. Pat. No. 5,238,280 to David Christensen, describes a ladder utility rack for pick-up cargo beds. It has two parallel horizontal base rails and at least two vertical stanchion units. Each base rail has at least three contiguous walls, including at least one horizontal and one vertical running wall and each is adapted to nest atop and against sidewalls of a cargo bed. These base rails are not connected to one another except via the stanchion units. These units have vertical legs running from each of the base rails upwardly and inwardly and terminate at a commonly connected horizontal cross member. A preferred embodiment includes rails which are unistructurally formed, e.g. extruded, including portions in the form of an upright or inverted "U".

U.S. Pat. No. 5,755,549 to Clarence Ogrodnick, describes a support frame which is secured within the cargo box of a pick-up truck. The frame supports a drive train comprising a differential driven by a motor. One differential shaft drives a first cable winch while the other shaft incorporates a clutch to drive a second and third winch either independently from each other or in unison. A system of pulleys ensures that cable wind on the first and second winches is toward the front of the cargo box while on the third winch it is toward the rear. The cable ends are secured to a cargo platform. When the electric motor is engaged the first and second winches are rotated, in a counterclockwise direction which winds the cable into the winch body. The retracting cable first raises and then draws the platform onto the frame. During this process the third winch freewheels and releases cable as necessary. Unloading the platform requires that the clutch mechanism is engaged to couple the second and third winches together. The motor is reversed and the first, second, and third winches rotate in a clockwise direction. The third winch retracts cable while the first and second winches release cable. The retracting cable, draws the platform off the support frame and toward the rear of the cargo box. As the platform draws far enough rearward to tilt off the support frame, the clutch is disengaged and the third winch freewheels, leaving the platform to continue to lower under its own weight.

U.S. Pat. No. 5,791,844 to Robert D. Anderson, describes an improved winch crank assembly for use on typical flatbed trailers whereon cargo is secured using flexible straps. It permits the rapid winding of the straps onto the winch and reduces the time required for winding the straps by tenfold or more. The winch crank assembly comprises a portable crank assembly wherein a single crank can be used to wind the straps onto a plurality of winches on a single trailer. In addition, the portability allows the user to conveniently carry the crank for use on other truck trailers.

Notwithstanding the prior art, the present invention is neither taught nor rendered obvious thereby.

SUMMARY OF THE INVENTION

The present invention is a winch component set, as well as a reversible, portable winch for attachment to a load-bearing structure. It includes a shaft for rotation; a take-up reel for winding and unwinding a flexible securing strap, the take-up reel being connected to the shaft and affixed thereto for rotation therewith; a flexible securing strap attached to the take-up reel at a first end thereof; a plurality of bidirectional pawl-engaging teeth located about the shaft and so as to permit rotation of the take-up reel and the shaft by being engaged and disengaged with a pawl; and a winding mechanism connected to the shaft or the take-up reel for winding the shaft and the take-up reel; support for supporting the shaft and the pawl. The winch component set may be connected via its shaft to a support and the pawl may be movably connected to the support as well. In some preferred embodiments, the support is a separate component for attachment to a load-bearing structure, while in other embodiments, the support may be an integral component or portion of a structure, such as a ladder utility rack attached to the cargo bed of a pick-up truck or the top of a motor vehicle.

In one preferred embodiment of the present invention, the winding mechanism is a gripping wheel located on the shaft of the winch. In another embodiment, the winding mechanism is a removable handle. In yet another embodiment, the winding mechanism may be both a gripping wheel and a handle.

BRIEF DESCRIPTION OF THE DRAWINGS

The present invention should be more fully understood when the specification herein is taken in conjunction with the drawings appended hereto wherein:

FIG. 2 shows a side cut view of one embodiment of a present invention reversible, portable winch component with bidirectional ratchet teeth;

FIG. 3 shows a left end view of the winch component shown in FIG. 2;

FIG. 4 shows a cut right side view of the winch component shown in FIG. 2 as taken along cut line AB of FIG. 2;

DETAILED DESCRIPTION OF THE PRESENT INVENTION

The present invention is a reversible, portable winch as well as a winch component set, which includes a winch shaft component with bidirectional ratchet teeth, and a pawl. Due to the portability and reversibility of the winch, a user is able to remove, reverse and install the component set for winding with the wheel to the right of the shaft or to the left of the shaft in opposite, mirror positions utilizing a single, simple pawl and having a single manner of installation.

Figure 1:
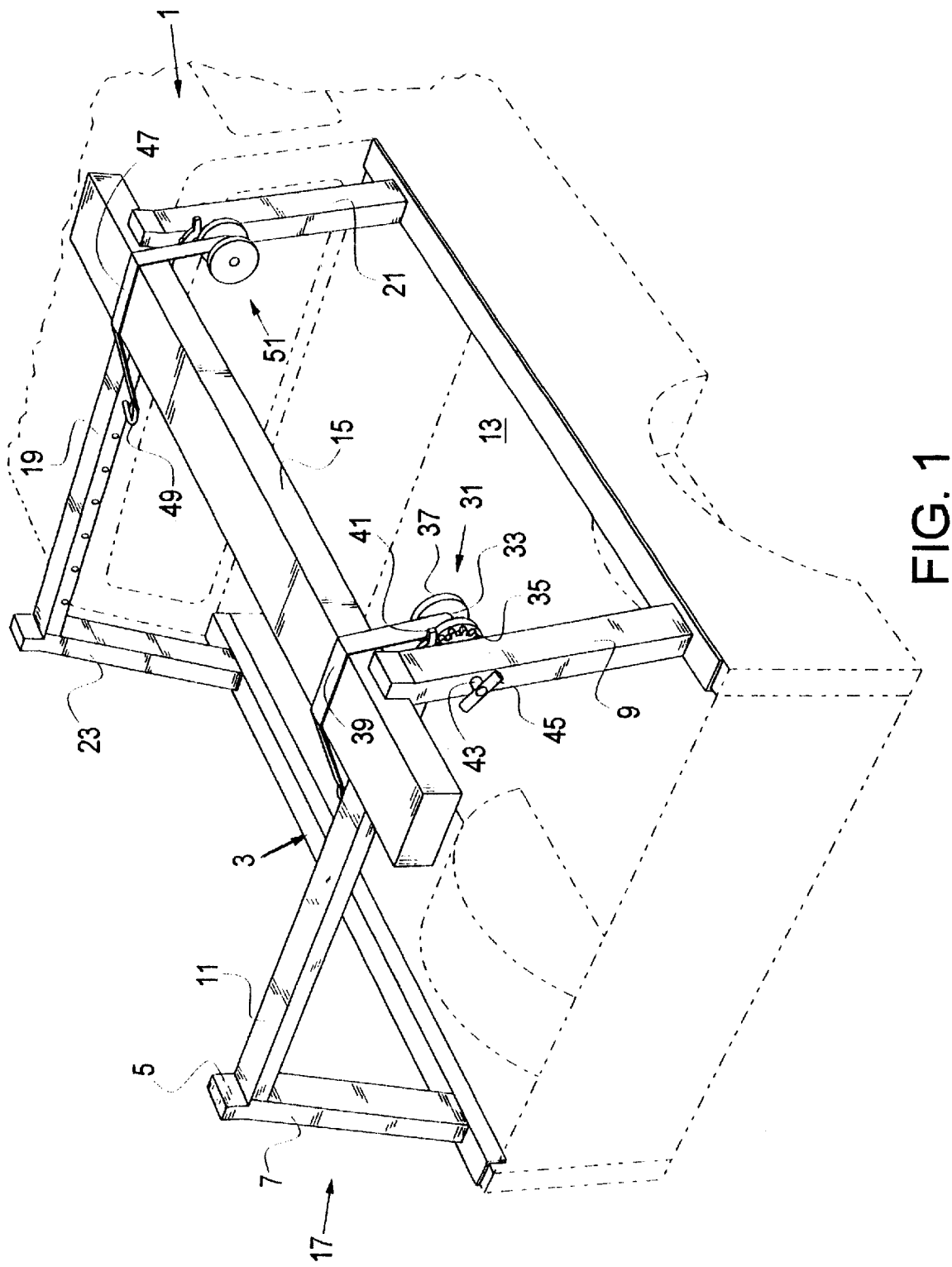
FIG. 1 shows an oblique view of a present invention reversible, portable winch with bidirectional ratchet teeth mounted on the utility rack of a pick up truck.

FIG. 1 shows an oblique view of a truck rack with a reversible, portable winch with bidirectional ratchet teeth. Thus, truck 1 has attached to its bed 13 a utility rack 3 having side rails such as vertical column 7 and, in this case, two stanchions are included in the rack. Rear stanchion 17 includes substantially vertical columns 7 and 9 and horizontal, connecting cross-member 11. Stops, such as stop 5, are also included. Front stanchion includes substantially vertical columns 21 and 33 and horizontal connecting cross member 19. In this case, beam 15 has been secured to the utility rack by present invention reversible, portable, bidirectional winches 31 and 51. Winch 31 and winch 51 are substantially identical with one being reversed relative to the other.

Referring now specifically to winch 31, it includes a spool 33 which has on one side, a wheel handle 37, and on its other side, a set of bidirectional ratchet teeth 35 for engagement and disengagement with pawl 41. Pawl 41 has a pin on which it pivots or rotates for locking and unlocking with teeth 35 to tighten, hold and then loosen strap 39. Strap 39 is connected to the spool 33 and has a securing hook on its opposite end (not shown). Winch 31 is similar and has a security strap 47 with hook 49. Removable handle 45 is attached to shaft 43 and may be used to tighten spool 33 with pawl 41 then locking into an appropriate tooth. Thus, straps 39 and 47 secure beam 15 to the rack by being tightened by the handles and locked into place by the pawls, as described.

As an alternative to going directly through substantially vertical column 9, there may be a support block attached to substantially vertical column 9 which could be attached by channel mechanisms, or otherwise. It could be removable and would act as a support for the winches in place of the main column structure itself. This support block would enable a user to retrofit existing utility racks and would have appropriate orifices positioned functionally for the winch shaft and pawl pin.

FIG. 2 shows a side cut view of an alternative present invention winch component 201. FIG. 3 shows a left side view thereof and FIG. 4 shows a right partially cut side view thereof along line A–B. Taking these figures collectively, like parts are like numbered and they will be discussed together.

Winch 201 includes shaft 203 with handle engagement end 205 and spool 207 at its apposite end. The outer most flange of spool 207 is a gripping wheel 209. The inner flange 211 includes extended walls 215 and 219 with bidirectional teeth such as tooth 213 (FIGS. 2 and 4). Security strap 231 extends therefrom and is removably connected thereto via attachment 217. Pawl 221 pivots on pin 223 for locking and unlocking with the bidirectional teeth. Orifices 225 and 227 on right end 205 on shaft 203 are adapted to receive locking pins and handle connections. Also, right end 205 could be modified to have a hexagonal cross-section for use in conjunction with a handle such as that shown in FIG. 7, which is more fully described below.

Figure 5:
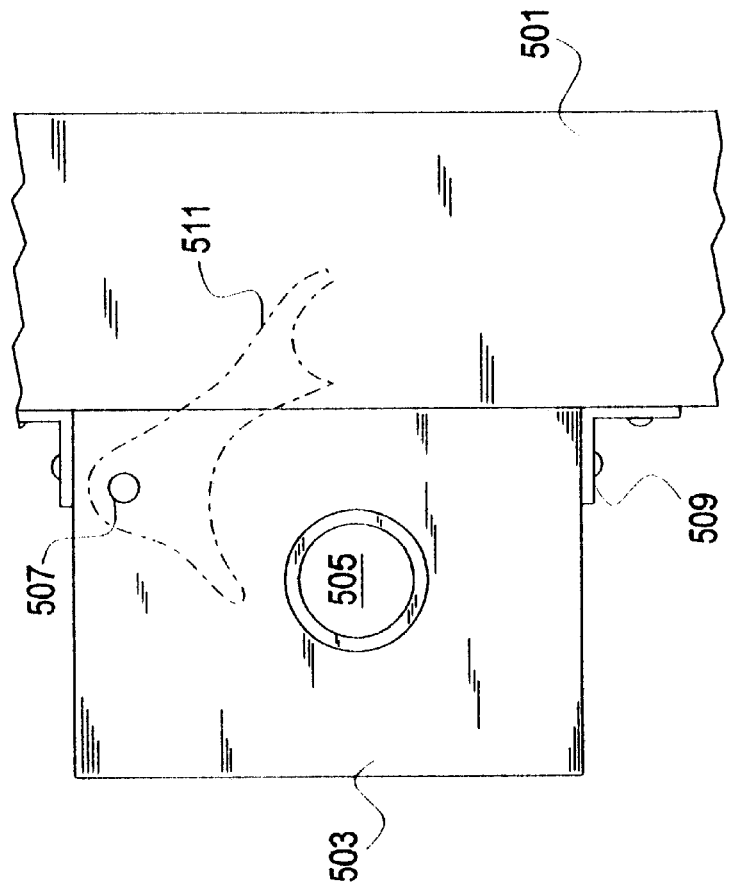
FIG. 5 shows a side view of a portion of a utility rack with a support block attached thereto for receiving both a winch and a separate pawl.

FIG. 5 shows a side view of a substantially vertical column 501 of a utility rack, with a support block 503 attached thereto. Support block 503 may be connected to substantially vertical column 501 via direct bolting, via inter-connecting channels with locks, or by nuts, bolts and brackets such as bracket 509. Support block 503 includes winch shaft orifice 505 for receiving a winch shaft such as winch shaft of FIG. 2. Orifice 507 is strategically located relative to orifice 505 and adapted to receive a pawl pin such as for pawl 511. By "strategically located" is meant that it is permissioned to permit engagement and disengagement of a pawl with bidirectional ratchet teeth of a present invention winch.

Figure 6:
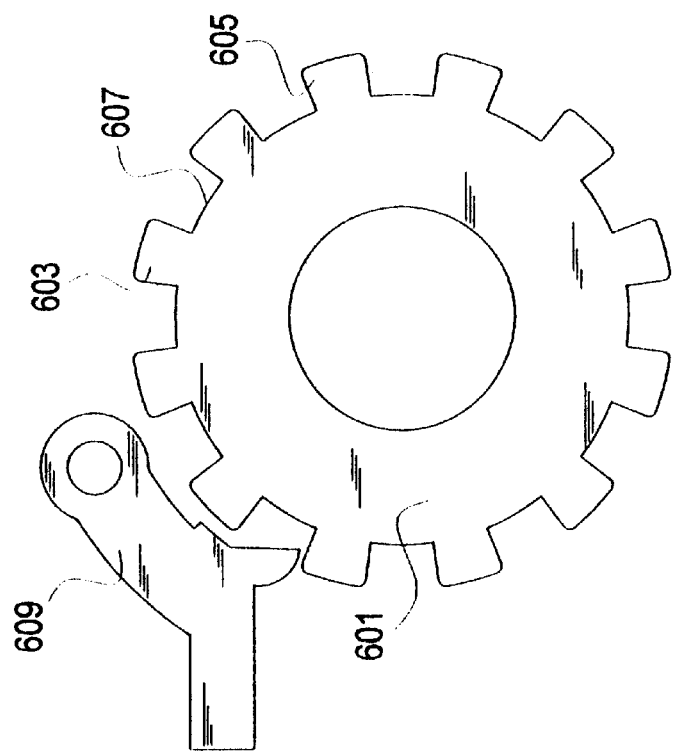
FIG. 6 shows a side view of alternate embodiment bidirectional ratchet teeth which may be used in the present invention.

FIG. 6 shows a partial cut side view of an alternative embodiment set of bidirectional ratchet teeth. Thus, flange 601 includes extended rectangular teeth 603 and 605, for example, with cut outs such as cut out 607. These could replace the bidirectional teeth of FIG. 2 and still function well with a pivoting pawl, such as pawl 609 shown in FIG. 6.

Figure 7:
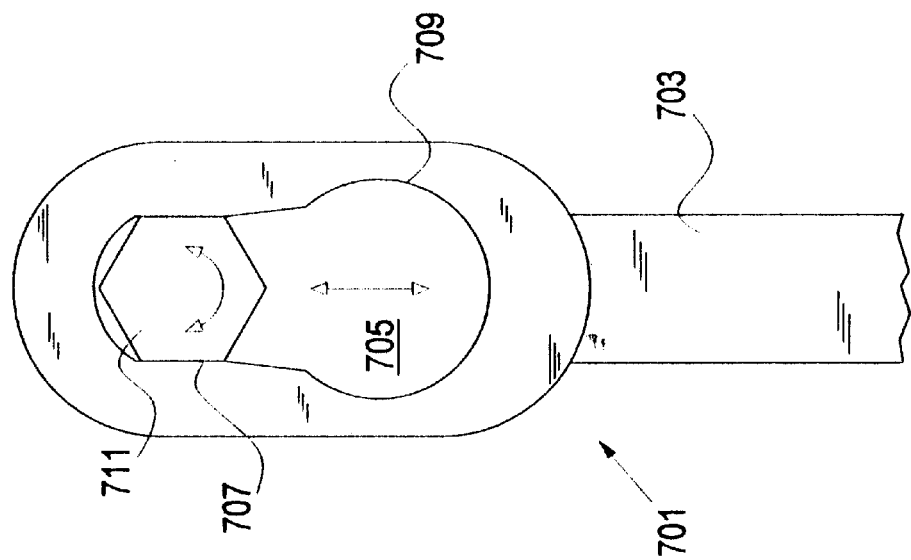
FIG. 7 shows a partial side view of an alternative embodiment handle member for engaging, rotating and disengaging a present invention winch axle of the present invention.

FIG. 7 shows a side partial view of an alternative handle design which may be used to tighten a present invention winch shaft. Here, non-spool shaft end 711 is hexagonal with flat edges and handle 701 has a head with opening 705. Opening 705 has a wider end 709 and a narrower end 707. A user may push the handle grip 703 forward to disengage it and pull handle grip 703 back so that narrow end 707 engages shaft 711 for rotation. This engage-rotate-disengage-reengage process may be repeated to achieve maximum tautness of the winch and securing strap.

Figure 8:
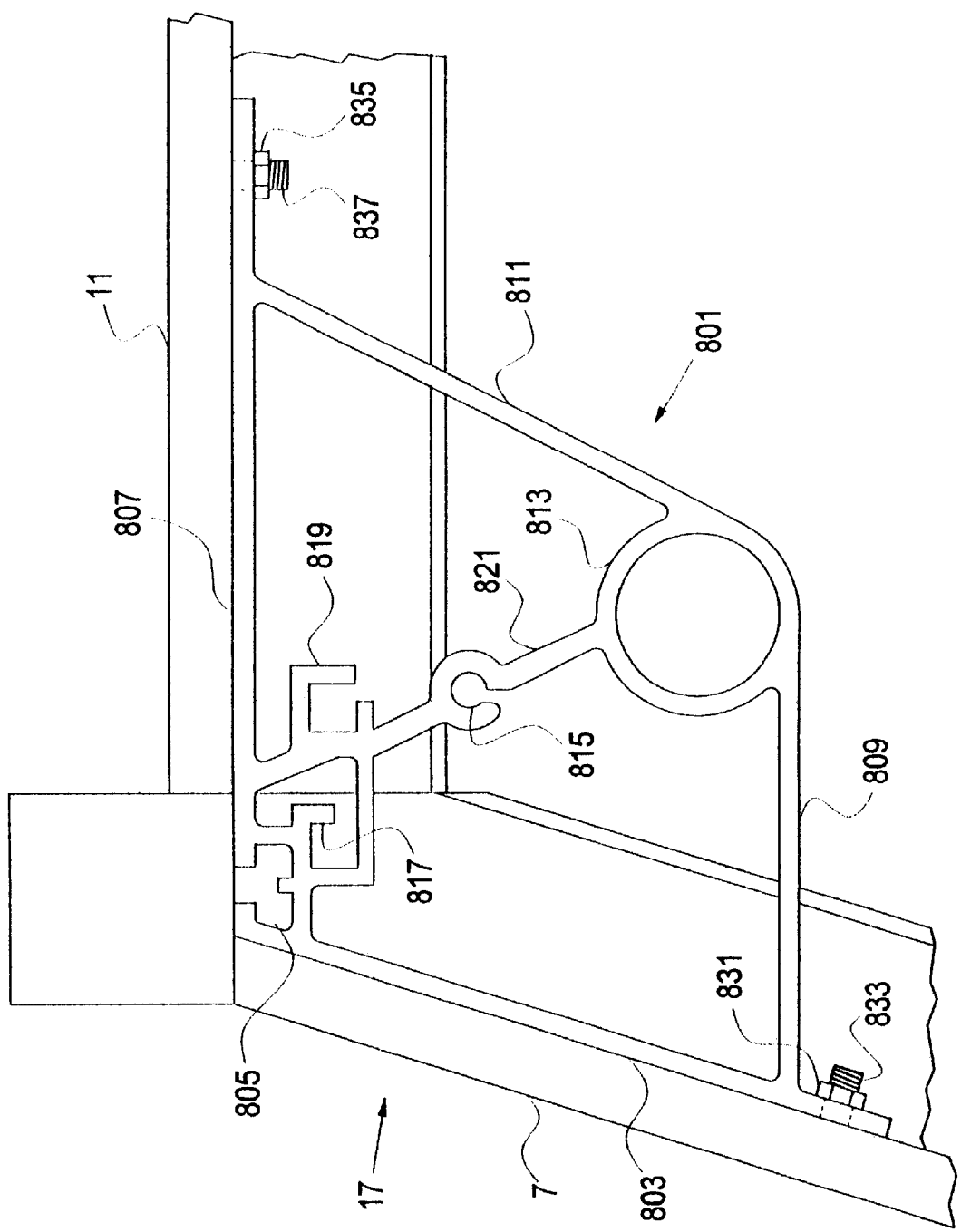
FIG. 8 illustrates a side view of a gusset adapted as a support block for a present invention winch mounted at the intersection of a vertical support and a cross member of a utility rack.

FIG. 8 shows a side view of a gusset 801 which is used to support a cross member 11 with a vertical column 7 of a utility rack 17, here at the point where vertical column 7 and connecting cross-member 11 (from FIG. 1) are connected to one another. Gusset 801 is attached to vertical column 7 with nut 831 and bolt 833, and is attached to connecting cross-member 11 with nut 835 and bolt 837. Gusset 801 includes an upright wall 803 with locking channel 805 and horizontal wall 807. Thus, upright wall 803 would be attached against the inside of vertical column 7 of FIG. 1 and horizontal wall 807 would be attached to the underside of connecting cross-member 11 of FIG. 1. There are right and bottom walls 811 and 809, respectively, to create the substantially irregular block form and a cross member wall 821 with various geometries 817 and 819 for possible attachments. Large circular orifice 813 is adapted to receive a shaft of a present invention winch. Likewise, smaller orifice 815 is the correct size and properly located to receive a pawl pin. The pawl pin may be inserted first and then kept in place (rotatably maintained) in orifice 815 by virtue of flange 211 shown in FIG. 2 when the shaft is subsequently inserted in orifice 815. Additionally, the shaft may be kept in place by a pin such as a pin placed in orifice 825 of shaft 203 shown in FIG. 2 and/or a removable handle such as shown in FIG. 1. Nuts 831 and 835 and bolts 833 and 837, respectively, are used to secure gusset 801 to utility rack 17.

Figure 9:
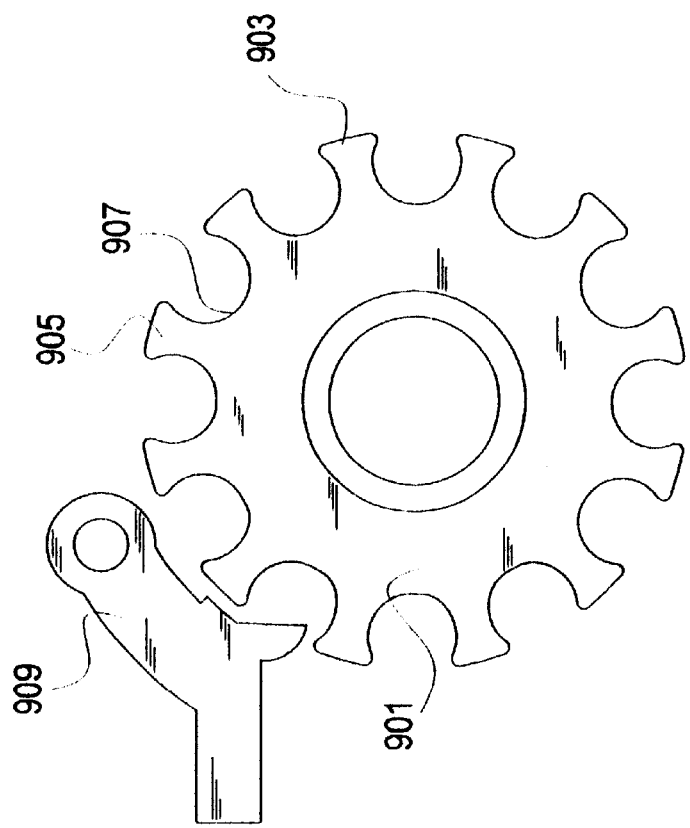
FIG. 9 shows a side view of another alternative present invention ratchet with bidirectional teeth and pawl.

FIG. 9 shows a partial cut side view of another alternative embodiment set of bidirectional ratchet teeth. Thus, flange 901 includes extended rectangular teeth 903 and 905, for example, with semicircular cut outs such as cut out 907. These could replace the bidirectional teeth of FIG. 2 and still function well with its pivoting pawl 909.

Figure 10:
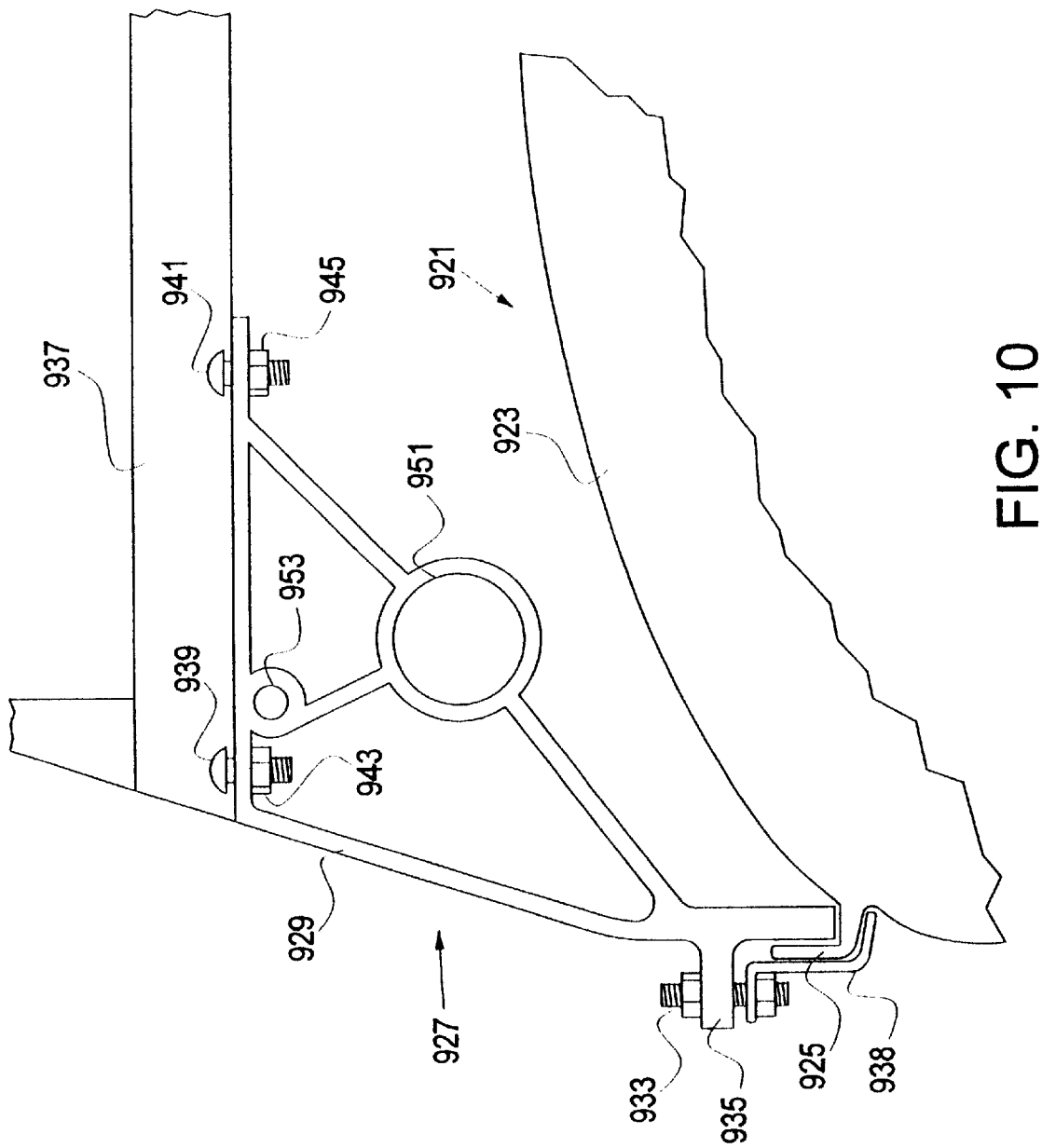
FIG. 10 shows a partial side cut view of an alternative utility rack adapted with winch axle and pawl mounting orifices for rooftops of vehicles.

FIG. 10 shows a partial side view of a panel truck 921 with a present invention utility rack 927 adapted to receive a present invention winch and pawl (not shown). There is a mounting bracket 929 and a mirror image opposite bracket on the opposite side (not shown). Mounting bracket 929 is mounted to panel truck drain gutter 925, located on roof 923, with bolt and nuts 933 and L-bracket 938, as shown. Mounting bracket 929 is connected to horizontal cross member 937 with bolts 939 and 941 and nuts 943 and 945. This creates a utility rack which may be used similarly to that shown in FIG. 1, except that it is attached to the roof of a panel truck or other motor vehicle and utilizes mounting brackets instead of uprights. Mounting bracket 929 has a large orifice 951 adapted to receive a present invention winch such as that shown in FIG. 2 and mounted in a similar fashion to that shown in FIG. 1. Smaller orifice 953 is adapted to receive a pawl such as that shown in the Figures above. Subsequently, the use of a present invention winch and pawl mounted in mounting bracket 929 would be operated in the same fashion as described above.

Figure 11:
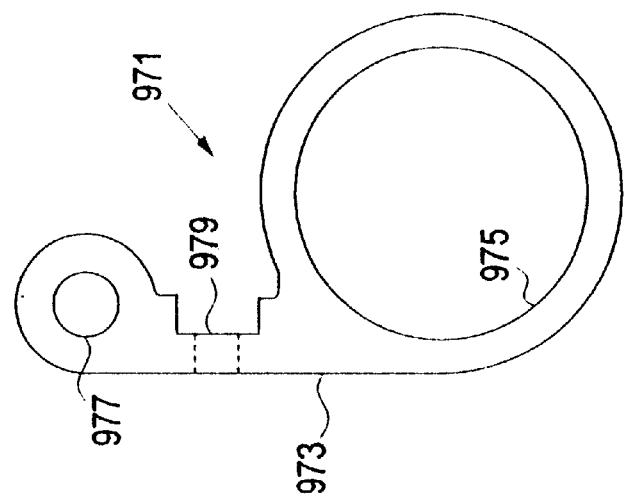
FIG. 11 illustrates a side view of one winch support member of the present invention; and, FIG. 12 shows a side view of another support member of the present invention.

FIG. 11 shows a side view of a support means of the present invention and this involves housing 971 with a vertical flat surface 973, bolt hole 979 and two circular formations, 975 and 977, respectively, for receiving shafts and pawls of the present invention described above.

Figure 12:
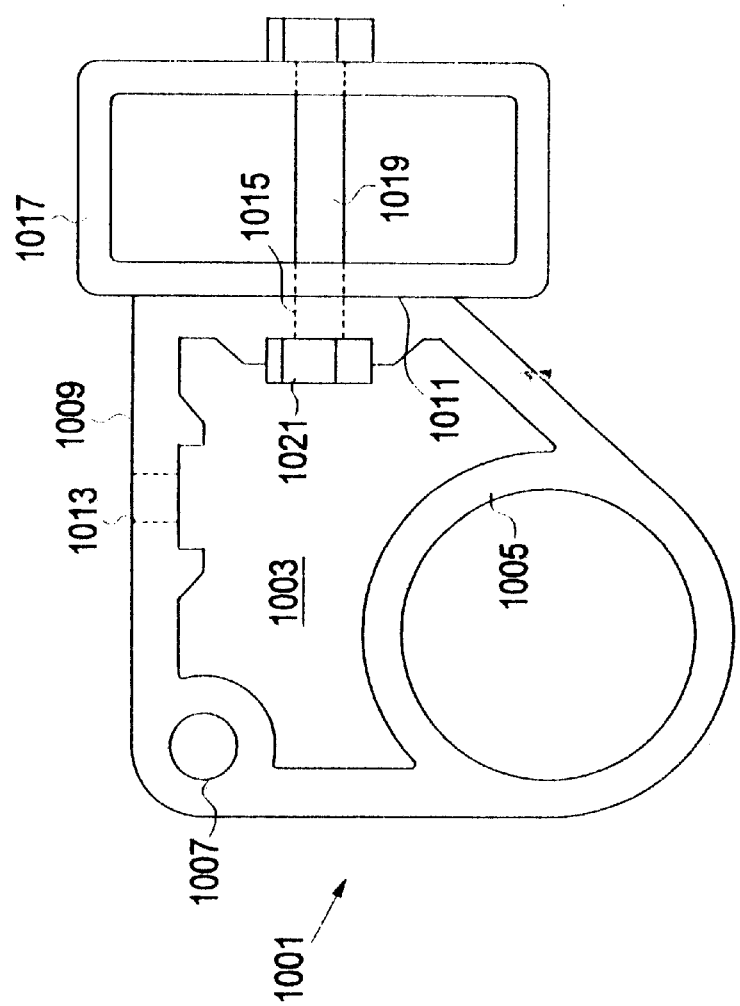

FIG. 12 shows a side cut view of one present invention support means which may be used in conjunction with a present invention winch component set, to establish a completely functional winch. Here, the support means is housing 1001 which is a cut, extruded metal housing which may preferably be formed of aluminum. It has a hollow area 1003 which permits nut and bolt fastening clearance, as well as a hollow tubular portion 1005 which is adapted to receive a winch shaft such as described above. Additionally, there is an orifice 1007 for receiving a pawl to effectuate functional interaction between the pawl and bidirectional teeth of the ratchet, as shown for example, in FIG. 4. There are also horizontal and vertical flat surfaces 1009 and 1011, respectively, for underside horizontal mounting or vertical mounting. In FIG. 12, housing 1001 is vertically mounted on metal rail 1017 with bolt 1019 and nut 1021. Top portion 1009 and back portion 1011 each have drilled holes such as holes 1013 and 1015 for receiving bolts, as shown.

Obviously, numerous modifications and variations of the present invention are possible in light of the above teachings. It is therefore understood that within the scope of the appended claims, the invention may be practiced otherwise than as specifically described herein.

What is claimed is:

1. A reversible, portable winch for attachment to a load-bearing structure which comprises:
   (a) a winch shaft for rotation;
   (b) a take-up reel for winding and unwinding a flexible securing strap, said take-up reel being connected to said shaft and affixed thereto for rotation therewith;
   (c) a flexible securing strap connected to said take-up reel at a first end thereof;
   (d) a single pawl operationally connected to said teeth in a first position or second position for engaging and disengaging thereof,
   (e) a plurality of bi-directional pawl-engaging teeth located about said shaft and affixed thereto so as to prevent and permit rotation of said take-up reel and said shaft by being engaged and disengaged with said pawl, said bi-directional teeth being adapted so as to permit rotation of said take-up reel in counterclockwise direction and to prevent rotation of said take-up reel in a clockwise direction when said pawl is in said first position, and being adapted so as to permit rotation of said take-up reel in a clockwise direction and to prevent rotation of said take-up reel in a counterclockwise direction when said pawl is in said second position;
   (f) winding means connected to one of said shaft and said take-up reel for winding said shaft and said take-up reel;
   (g) support means for supporting said shaft and said pawl said, support means having an orifice with said winch shaft rotatably located at least partially within said orifice, said support means including attachment means for attaching said support means to load-bearing structure; and
   (h) a securing means for temporarily securing said shaft and pawl to said support means so as to permit rotation of said shaft in a first location in said support means and removal of said shaft and pawl from said support means and reinsertment thereof in a second location on an opposite side of said support means, so as to permit rotation of said shaft in said second location.

2. The reversible, portable winch in claim 1 wherein said plurality of bi-directional pawl-engaging teeth are located on a disk which is affixed to said shaft.

3. The reversible, portable winch of claim 1 wherein said plurality of said bi-directional pawl-engaging teeth each have a lower portion and an upper portion, and with said lower portion having a narrower section than a widest section of said upper portion, with said upper portion extending outwardly and away from said lower portion.

4. The reversible, portable winch of claim 1 wherein said support means is a support housing having an elongated hollow element adapted to receive said shaft, and having a pawl-receiving orifice located thereon to functionally receive and position said pawl relative to said pawl-engaging teeth.

5. The reversible, portable winch of claim 1 wherein said winding means is a handle connected to said shaft.

6. The reversible, portable winch of claim 5 wherein said handle is connected to said shaft so as to engage said shaft when in a first position and so as to disengage said shaft when in a second position.

7. The reversible, portable winch of claim 1 wherein said pawl is a stand alone element having a pivoting shaft for engaging and disengaging, which pivoting shaft is removeably connected to said support means and located adjacent to said bi-directional pawl-engaging teeth, for engaging and disengaging said teeth.

8. The reversible, portable winch of claim 7 wherein said take-up reel has an extended side wall adapted to retain said pawl.

9. A reversible, portable winch component set for attachment to a support which comprises:

(a) a winch shaft for rotation;

(b) a take-up reel for winding and unwinding a flexible securing strap, said take-up reel being connected to said shaft and affixed thereto for rotation therewith;

(c) a flexible securing strap connected to said take-up reel at a first end thereof;

(d) a single pawl operationally connected to said teeth in a first position or second position for engaging and disengaging thereof;

(e) a plurality of bi-directional pawl-engaging teeth located about said shaft and affixed thereto so as to prevent and permit rotation of said take-up reel and said shaft by being engaged and disengaged with said pawl, said bi-directional teeth being adapted so as to permit rotation of said take-up reel in counterclockwise direction and to prevent rotation of said take-up reel in a clockwise direction when said pawl is in said first position, and being adapted so as to permit rotation of said take-up reel in a clockwise direction and to prevent rotation of said take-up reel in a counterclockwise direction when said pawl is in said second position;

(f) winding means connected to one of said shaft and said take-up reel for winding said shaft and said take-up reel; and (g) a securing means for temporarily securing said shaft and pawl to a support means so as to permit rotation of said shaft in a first location in said support means and removal of said shaft and pawl from said support means and reinsertment thereof in a second location on an opposite side of said support means, so as to permit rotation of said shaft in said second location.

10. The reversible, portable winch of claim 9 wherein said plurality of bi-directional pawl-engaging teeth are located on a disk which is affixed to said shaft.

11. The reversible, portable winch of claim 9 wherein said plurality of said bi-directional pawl-engaging teeth each have a lower portion and an upper portion, and with said lower portion having a narrower section than a widest section of said upper portion, with said upper portion extending outwardly and away from said lower portion.

12. The reversible, portable winch of claim 9 wherein said support means is a support housing having an elongated hollow element adapted to receive said shaft, and having a pawl-receiving orifice located thereon to functionally receive and position said pawl relative to said pawl-engaging teeth.

13. The reversible, portable winch of claim 9 wherein said winding means is a handle connected to said shaft.

14. The reversible, portable winch of claim 13 wherein said handle is connected to said shaft so as to engage said shaft when in a first position and so as to disengage said shaft when in a second position.

15. The reversible, portable winch of claim 9 wherein said pawl is a stand alone element having a pivoting shaft for engaging and disengaging, which pivoting shaft is removeably connected to said support means and located adjacent to said bi-directional pawl-engaging teeth, for engaging and disengaging said teeth.

16. The reversible, portable winch of claim 15 wherein said take-up reel has an extended side wall adapted to retain said pawl when said pawl pivoting shaft is removeably connected to said support means.

* * * * *